(12) United States Patent
Chen et al.

(10) Patent No.: US 12,732,000 B2
(45) Date of Patent: Sep. 8, 2026

(54) INPUT POWER ADJUSTMENT FOR MICROINVERTER, CONTROLLER, AND PHOTOVOLTAIC ENERGY STORAGE SYSTEM

(71) Applicant: Anker Innovations Technology Co., Ltd., Changsha (CN)

(72) Inventors: Wei Chen, Shenzhen (CN); Yiyong Li, Shenzhen (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 0 days.

(21) Appl. No.: 19/203,942

(22) Filed: May 9, 2025

(65) Prior Publication Data

US 2025/0357763 A1 Nov. 20, 2025

(30) Foreign Application Priority Data

May 17, 2024 (CN) ......................... 202410622352.4

(51) Int. Cl.

*H02J 3/38* (2026.01)
*H02J 7/35* (2006.01)
*H02J 101/24* (2026.01)
*H02S 40/32* (2014.01)

(52) U.S. Cl.

CPC ................ *H02J 3/381* (2013.01); *H02J 7/35* (2013.01); *H02S 40/32* (2014.12); *H02J 2101/24* (2026.01)

(58) Field of Classification Search

CPC .......... H02J 3/381; H02J 7/35; H02J 2101/24; H02S 40/32

See application file for complete search history.

(56) References Cited

U.S. PATENT DOCUMENTS

2023/0294544 A1* 9/2023 Sowa ...................... B60L 53/66 700/291

* cited by examiner

*Primary Examiner* — Carlos Amaya
(74) *Attorney, Agent, or Firm* — Banner & Witcoff, Ltd.

(57) ABSTRACT

Disclosed are a method for adjusting input power of a microinverter, a controller, and/or a photovoltaic energy storage system. A photovoltaic assembly may be connected to an energy storage device and a microinverter. In response to the received charging command including target input power of the microinverter, aspects described herein relate to obtaining an output voltage of a photovoltaic panel, an input current of the microinverter, and charging parameters of the energy storage device, then determining input power of the microinverter based on the input current of the microinverter and the output voltage of the photovoltaic panel. Then, aspects described herein may adjust charging parameters of the energy storage device until an absolute value of power difference between the input power and the target input power of the microinverter may be less than or equal to a preset power difference threshold.

20 Claims, 8 Drawing Sheets

INPUT POWER ADJUSTMENT FOR MICROINVERTER, CONTROLLER, AND PHOTOVOLTAIC ENERGY STORAGE SYSTEM

CROSS-REFERENCE TO RELATED APPLICATION

The present application claims priority to Chinese Patent Application No. 202410622352.4, filed on May 17, 2024, which is herein incorporated by reference by its entirety.

FIELD

The present disclosure relates to energy storage, particularly to a method for adjusting input power of a microinverter, a controller, and/or a photovoltaic energy storage system.

BACKGROUND

A microinverter may be a power converter capable of inverting direct current (DC) power into alternating current (AC) power. Due to functions such as power adjustment, power grid interconnection, and safety protection, the microinverter may be widely used. When applied to a photovoltaic power generation system, a microinverter may be used for converting the DC power generated by photovoltaic panels into AC power to be supplied to a power grid or other load devices.

Output power of the photovoltaic panel may be affected by factors such as light intensity and/or temperature, which may result in unstable output power of the photovoltaic panel, and in turn might affect input power of the microinverter. However, rated power of the microinverter may be limited, and the input power of the microinverter exceeding a rated power range may cause the microinverter to malfunction or be damaged.

In turn, the current methods for adjusting input power of a microinverter still fail to accurately and effectively control the input power of the microinverter.

SUMMARY

Aspects described herein may relate to a method for adjusting input power of a microinverter, a controller, and/or photovoltaic energy storage system, a computer device, and/or a storage medium capable of the same.

Aspects described herein provide a method for adjusting input power of a microinverter applied to a photovoltaic energy storage system which includes a photovoltaic assembly, an energy storage device, and/or a microinverter, in which the photovoltaic assembly may be connected to the energy storage device and the microinverter separately, the method including: in response to the received charging command including target input power of the microinverter, obtaining an output voltage of a photovoltaic panel, an input current of the microinverter, and charging parameters of the energy storage device; determining input power of the microinverter based on the input current of the microinverter and the output voltage of the photovoltaic panel; and/or adjusting charging parameters of the energy storage device based on the input power of the microinverter, the target input power and a preset power difference threshold, until an absolute value of power difference between the input power and the target input power of the microinverter may be less than or equal to the power difference threshold.

Adjusting charging parameters of the energy storage device based on the input power of the microinverter, the target input power and a preset power difference threshold may comprise obtaining an absolute value of difference between the input power and the target input power of the microinverter as the absolute value of the power difference; and/or adjusting charging parameters of the energy storage device based on a mapping relationship between the absolute value of the power difference and a plurality of preset power difference intervals, the different power difference intervals corresponding to different parameter adjustment rates.

Adjusting charging parameters of the energy storage device based on a mapping relationship between the absolute value of the power difference and a plurality of preset power difference intervals may comprise, when the input power of the microinverter may be greater than the target input power and the absolute value of the power difference may be greater than the power difference threshold, increasing charging parameters of the energy storage device based on the mapping relationship between the absolute value of the power difference and a plurality of preset power difference intervals.

Adjusting charging parameters of the energy storage device based on a mapping relationship between the absolute value of the power difference and a plurality of preset power difference intervals may comprise, when the input power of the microinverter may be less than the target input power and the absolute value of the power difference may be greater than the preset power difference threshold, reducing charging parameters of the energy storage device based on the mapping relationship between the absolute value of the power difference and a plurality of preset power difference intervals.

Increasing charging parameters of the energy storage device based on the mapping relationship between the absolute value of the power difference and a plurality of preset power difference intervals may comprise increasing charging parameters of the energy storage device based on a preset first parameter adjustment rate when the absolute value of the power difference may be mapped in a first power difference interval among a plurality of preset power difference intervals; increasing charging parameters of the energy storage device based on a preset second parameter adjustment rate when the absolute value of the power difference may be mapped in a second power difference interval among a plurality of preset power difference intervals; and/or increasing charging parameters of the energy storage device based on a preset third parameter adjustment rate when the absolute value of the power difference may be mapped in a third power difference interval among a plurality of preset power difference intervals, in which a numerical range of the first power difference interval may be smaller than a numerical range of the second power difference interval, and the numerical range of the second power difference interval may be smaller than a numerical range of the third power difference interval; the first parameter adjustment rate may be less than the second parameter adjustment rate, and the second parameter adjustment rate may be less than the third parameter adjustment rate.

Reducing charging parameters of the energy storage device based on the mapping relationship between the absolute value of the power difference and a plurality of preset power difference intervals may comprise reducing the charging parameter of the energy storage device based on a preset fourth parameter adjustment rate when the absolute value of the power difference may be mapped in the first power difference interval among a plurality of the preset power difference intervals; reducing the charging parameter of the energy storage device based on a preset fifth parameter adjustment rate when the absolute value of the power difference may be mapped in the second power difference interval among a plurality of the preset power difference intervals; and/or reducing the charging parameter of the energy storage device based on a preset sixth parameter adjustment rate when the absolute value of the power difference may be mapped in the third power difference interval among a plurality of the preset power difference intervals, in which a numerical range of the first power difference interval may be smaller than a numerical range of the second power difference interval, and the numerical range of the second power difference interval may be smaller than a numerical range of the third power difference interval; the fourth parameter adjustment rate may be less than the fifth parameter adjustment rate, and the fifth parameter adjustment rate may be less than the sixth parameter adjustment rate.

Adjusting charging parameters of the energy storage device may comprise adjusting a charging current or charging power of the energy storage device, in which an increased charging current of the energy storage device may be less than or equal to a maximum limit current of the microinverter.

Aspects described herein also relate to a photovoltaic energy storage system including: a photovoltaic assembly, a microinverter and/or an energy storage device, in which the photovoltaic assembly may be separately connected to the microinverter and the energy storage device; the photovoltaic assembly may be configured to convert received solar energy into electrical energy and supply power to the energy storage device and the microinverter in parallel; the microinverter may be configured to convert the received electrical energy into electrical energy for power supply to supply power to a load end, and configured to feed back an input current to the energy storage device upon receiving a data sampling message sent by the energy storage device; and/or the energy storage device may be configured to adjust charging parameters of the energy storage device according to the steps in any of the above examples of the method for adjusting input power of a microinverter upon receiving a charging command including target input power of the microinverter, until the absolute value of the power difference between the input power and the target input power of the microinverter may be less than or equal to a preset power difference threshold.

Aspects described herein also relate to a controller of input power of a microinverter which may be applied to a photovoltaic energy storage system including a photovoltaic assembly, an energy storage device, and/or a microinverter, in which the photovoltaic assembly may be separately connected to the energy storage device and the microinverter, and the energy storage device includes the controller. The controller may comprise a data obtaining module configured to, in response to the received charging command including target input power of the microinverter, obtain an output voltage of a photovoltaic panel, an input current of the microinverter, and charging parameters of the energy storage device; a data calculation module configured to determine input power of the microinverter based on the input current of the microinverter and the output voltage of the photovoltaic panel; and/or a data adjustment module configured to adjust charging parameters of the energy storage device based on the input power of the microinverter, the target input power and a preset power difference threshold, until an absolute value of power difference between the input power and the target input power of the microinverter may be less than or equal to the power difference threshold.

Aspects described herein also relate to a computer device including a memory in which a computer program may be stored and a processor that performs one or more of the steps of any of the examples of the method for adjusting input power of a microinverter when executing the computer program.

Aspects described herein also relate to a computer-readable storage medium on which a computer program may be stored. A processor may perform one or more of the steps of any of the examples of the method for adjusting input power of a microinverter when executing the computer program.

Aspects described herein also relate to a computer program product including a computer program. A processor may perform one or more of the steps of any of the examples of the method for adjusting input power of a microinverter when executing the computer program.

In the method for adjusting input power of a microinverter, controller, computer device, storage medium, and photovoltaic energy storage system, the photovoltaic assembly may be connected to the energy storage device and/or the microinverter separately and may supply power to the energy storage device and the microinverter (e.g., in parallel). Upon receiving the charging command, the output voltage of the photovoltaic panel, the input current of the microinverter, and the charging parameters of the energy storage device may be obtained, enabling obtainment of accurate electrical energy information. The actual input power of the microinverter may be determined based on the input current of the microinverter and the output voltage of the photovoltaic panel, and may be compared with the target input power. If there may be large power difference therebetween, the input power of the energy storage device may be changed by adjusting the charging parameters of the energy storage device, so as to limit the input power of the microinverter and gradually reduce the power difference, until the absolute value of the power difference may be less than or equal to the preset power difference threshold. This may achieve a precise adjustment of the input power of the microinverter and may improve energy conversion efficiency between the photovoltaic power generation and the energy storage device.

DETAILED DESCRIPTION

Further detailed description of the present disclosure may be made with reference to the accompanying drawings and examples below. The specific examples described herein are merely for explaining the present disclosure and are not for limiting the present disclosure.

Figure 1:
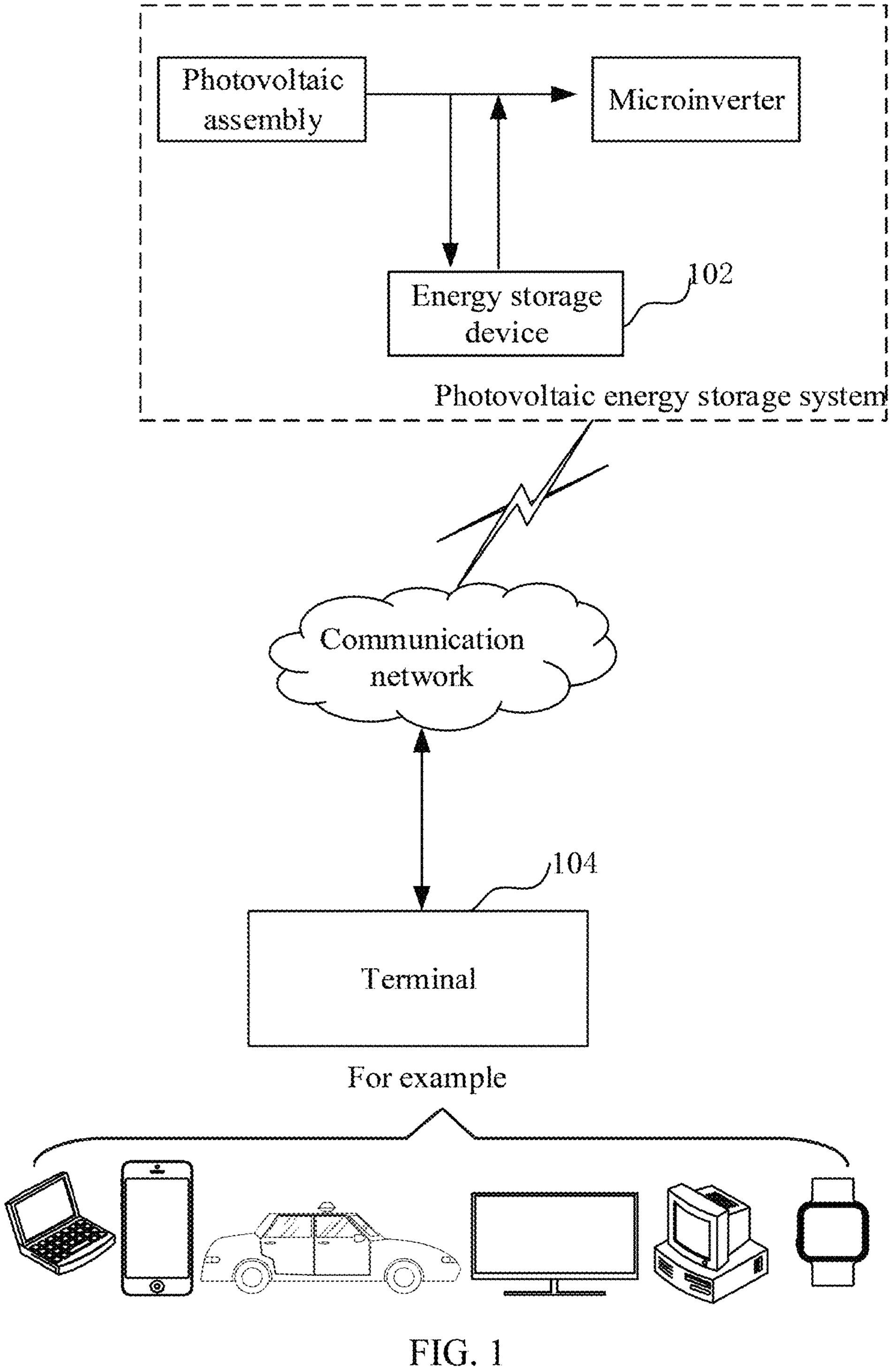
FIG. 1 depicts an application environment diagram of a method for adjusting input power of a microinverter.

The method for adjusting input power of a microinverter provided in the examples of the present disclosure can be applied in the application environment as shown in FIG. 1, in which a photovoltaic energy storage system comprises a photovoltaic assembly, an energy storage device, and/or a microinverter. The photovoltaic assembly may be connected to the energy storage device and the microinverter separately. The execution subject of the above method may be an energy storage device 102 which communicates with a user terminal 104 through a network. For example, the user terminal 104 may send a charging command including target input power of the microinverter to the energy storage device 102. The energy storage device 102 may respond to the charging command, may obtain output voltage of the photovoltaic assembly, input current of the microinverter, and/or charging parameters of the energy storage device. Then, based on the input current of the microinverter and the output voltage of the photovoltaic assembly, the input power of the microinverter may be determined and compared with the target input power to obtain an absolute value of the power difference. When the absolute value of the power difference between the input power and the target input power may be greater than a preset power difference threshold, a charging current of the energy storage device may be adjusted until the absolute value of the power difference may be less than or equal to the preset power difference threshold, that may be the input power of the microinverter approaches or equals the target input power.

The terminal 104 may include, but is not limited to, various personal computers, laptop computers, smartphones, tablet computers, Internet of Things (IoT) devices, and portable wearable devices. The IoT devices may include smart speakers, smart TVs, smart air conditioners, smart in-vehicle devices, and the like. The portable wearable devices may include smart watches, smart bracelets, head-mounted devices, and the like. The energy storage device may include, but may be not limited to, microinverter-based energy storage devices and residential energy storage devices (also referred to as household energy storage devices).

Figure 2:
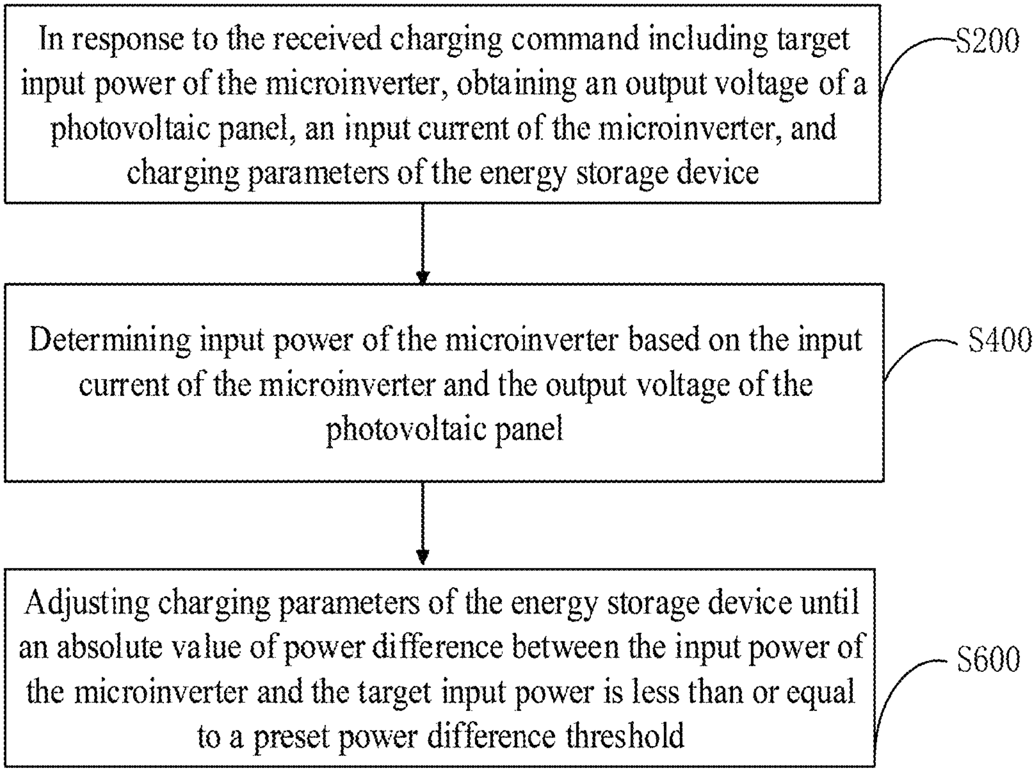
FIG. 2 depicts a flowchart of a method for adjusting input power of a microinverter.

FIG. 2 illustrates one or more steps of a method for adjusting input power of a microinverter. The method may be applied to the energy storage device 102 in FIG. 1 and may includes the following steps S200 to S600.

Step S200 comprises obtaining, in response to the received charging command including target input power of the microinverter, an output voltage of a photovoltaic panel, an input current of the microinverter, and/or charging parameters of the energy storage device.

The energy storage device may include, but is not limited to, microinverter-based energy storage devices and residential energy storage devices (also known as household energy storage devices), and/or other energy storage devices that input electricity generated by a photovoltaic array through photovoltaic power generation. The charging parameters of the energy storage device may include, but are not limited to, at least one of charging current, charging voltage, charging power, and charging rate. The target input power may refer to power output from the photovoltaic panel to the microinverter as set by a user, also referred to as the input power of the microinverter. The photovoltaic assembly may be a component for converting solar energy into electric energy. Specifically, the photovoltaic assembly may include, but is not limited to, one or more photovoltaic arrays and photovoltaic cell panels.

In some of the discussion herein, a photovoltaic panel is used as an example of the photovoltaic assembly. Different from conventional connection modes in which one photovoltaic panel may be connected to one microinverter, the photovoltaic panel described herein may be connected to the energy storage device and/or the microinverter separately and may supply power to the energy storage device and the microinverter (e.g., in parallel), which may reasonably allocate the output power of the photovoltaic panel to the energy storage device and the microinverter, fully utilize the power of the photovoltaic panel, and may improve an overall efficiency of the system. Moreover, the parallel power supply method may allow increasing or reducing the number of energy storage devices and microinverters at any time according to actual needs to adapt to system changes. When one device fails or encounters a problem, the system may continue supplying power through the other device, thereby reducing impact of the failure on system operation and improving reliability and stability of the system.

After converting solar energy into electrical energy, the photovoltaic panel may output part of the electrical energy to the energy storage device for storage, and may output part of the electrical energy to the microinverter which converts electrical energy of the photovoltaic panel into electrical energy for power supply, including converting DC power into AC power to supply power to a load end (such as a household). In addition, when the electrical energy generated by the microinverter on the photovoltaic assembly exceeds a current load demand, the microinverter may direct the excess electrical energy to the energy storage device for charging. Conversely, when the photovoltaic assembly supplies insufficient power, the microinverter may control discharging from the energy storage device to supplement the electrical energy needed by the load, ensuring continuity and stability of power supply.

Taking a microinverter-based energy storage device as an example of the photovoltaic energy storage device, the microinverter-based energy storage device may include interconnected direct current (DC) conversion modules such as a buck-boost DC/DC module and a microcontroller unit (MCU), where the DC conversion module may be connected to the microinverter. The buck-boost DC/DC module may be used to raise or lower the voltage of the DC power supply in the energy storage device to a level suitable for specific applications. The MCU of the energy storage device may be usually used to control and manage various aspects of the energy storage system, including battery management, charge/discharge control, communication interfaces, data acquisition and processing, and/or other functions, which may monitor and control the status of the energy storage system and execute various algorithms and logic to achieve safe and efficient operation of the energy storage system.

When a user has a charging demand, a charging command carrying target input power of the microinverter, e.g., 80 W (watts), may be sent to the MCU through a user terminal. The MCU may receive and parse the charging command, and may extract the target input power and other necessary parameters, such as a charging mode, a battery type, and/or specification parameters. In response to the charging command, the output voltage of the photovoltaic panel, the input current of the microinverter, and/or the charging current of the energy storage device may be sampled in real time, so as to monitor and obtain changes in the output voltage of the photovoltaic panel (hereinafter referred to as photovoltaic voltage), the input current of the microinverter, and/or the charging current of the energy storage device.

Step S400 may comprise determining input power of the microinverter based on the input current of the microinverter and the output voltage of the photovoltaic panel.

An actual input power of the microinverter may be be determined based on the input current of the microinverter and/or the photovoltaic voltage after the input current of the microinverter and/or the photovoltaic voltage are obtained. Specifically, the input current of the microinverter may be multiplied by the photovoltaic voltage to obtain the actual input power of the microinverter. For example, if the photovoltaic voltage may be 40 V (volts) and the input current of the microinverter may be 2 A (amperes), the input power of the microinverter may be 80 W.

Step S600 may comprise adjusting charging parameters of the energy storage device until an absolute value of power difference between the input power and the target input power of the microinverter is less than or equal to a preset power difference threshold.

After obtaining the input power of the microinverter, the input power may be compared with the target input power to obtain power difference between the input power and the target input power. Since the input power may be greater or less than the target input power, the power difference may be positive or negative. An ultimate goal may be to control the input power of the microinverter to equal or approximate the target input power. Therefore, in the example, the absolute value of the power difference may be obtained and compared with a preset power difference threshold, e.g., 1 W (1 watt). If the absolute value of the power difference may be greater than the preset power difference threshold, it may indicate that there may be a certain difference between the input power and the target input power of the microinverter and a user-defined charging requirement might not have been met. In such a case, it may be necessary to adjust the charging parameters of the energy storage device, including increasing or reducing the charging parameters of the energy storage device, so as to adjust the charging power of the energy storage device. As the charging power of the energy storage device changes, power allocated to the microinverter from the power generated by the photovoltaic panel might also change accordingly, thereby achieving the function of adjusting the input power of the microinverter. For example, the preset power difference threshold may also be set to 0.5 W, 2 W, or other values depending on actual needs.

The charging parameters of the energy storage device may be dynamically adjusted. For instance, the charging parameters may be dynamically adjusted based on the magnitude of the power difference. For example, if the power difference is relatively large, an adjustment range of the charging parameters may correspondingly increases; whereas, if the power difference is relatively small, the adjustment range may correspondingly decreases. Additionally and/or alternatively, the charging current may be adjusted based on changes in the output voltage of the photovoltaic panel, the charging voltage of the energy storage device, and/or the charging power of the energy storage device, so that the absolute value of the power difference between the input power and the target input power of the microinverter is less than or equal to the preset power difference threshold. For example, the difference may be low enough such that the input power approximates the target input power, thereby meeting the user-defined requirement.

In the above method for adjusting input power of a microinverter, the photovoltaic panel may be connected to the energy storage device and the microinverter separately and may supply power to the energy storage device and the microinverter (e.g., in parallel). Upon receiving the charging command, the output voltage of the photovoltaic panel, the input current of the microinverter, and the charging parameters of the energy storage device are obtained, enabling obtainment of accurate electrical energy information. The actual input power of the microinverter may be determined based on the input current of the microinverter and the output voltage of the photovoltaic panel, and may be compared with the target input power. If there may be large power difference therebetween, the input power of the energy storage device may be changed by adjusting the charging parameters of the energy storage device, so as to limit the input power of the microinverter and gradually reduce the power difference, until the absolute value of the power difference may be less than or equal to the preset power difference threshold. This achieves precise adjustment of the input power of the microinverter and further can improve energy conversion efficiency between the photovoltaic power generation and the energy storage device.

Figure 3:
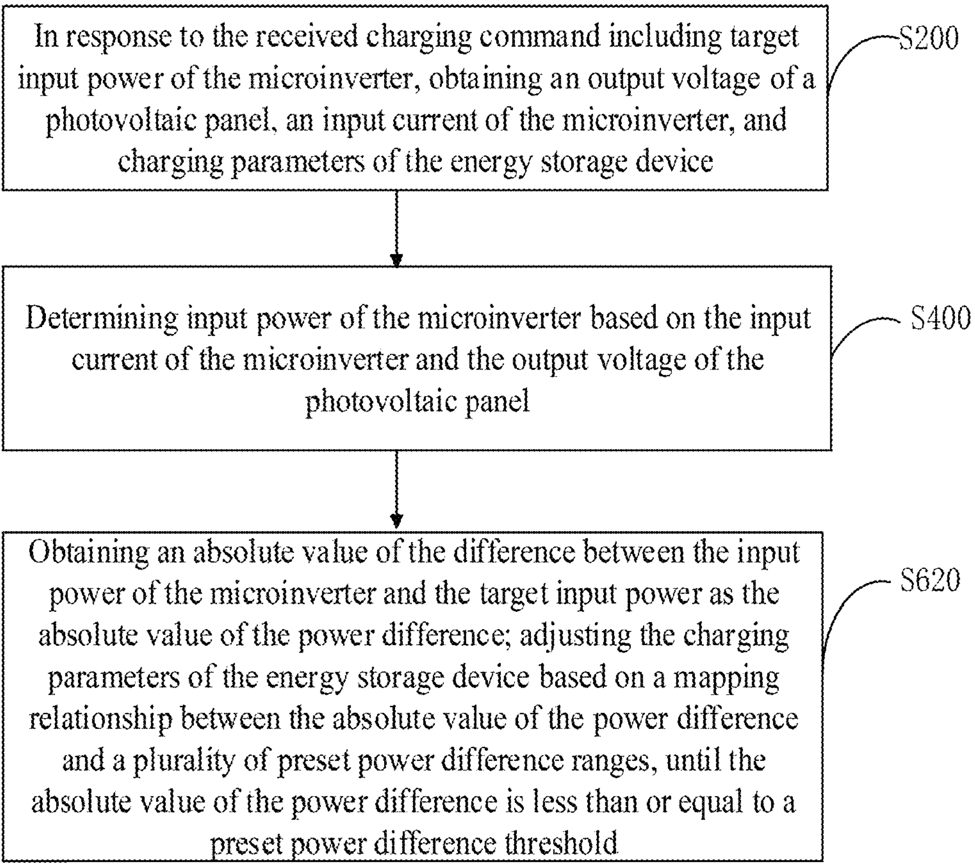
FIG. 3 depicts a flowchart of a method for adjusting input power of a microinverter.

As shown in FIG. 3, in an example, step S600 may comprise step S620, which may comprise obtaining an absolute value of the difference between the input power and the target input power of the microinverter as the absolute value of the power difference; adjusting the charging parameters of the energy storage device based on a mapping relationship between the absolute value of the power difference and a plurality of preset power difference intervals, until the absolute value of the power difference may be less than or equal to a preset power difference threshold.

Adjusting the charging parameters of the energy storage device may comprise adjusting the charging current or the charging power of the energy storage device.

In the context of, adjusting the charging current of the energy storage device, a plurality of power difference intervals may be preset according to performance requirements of the system and actual situations, and/or a corresponding current adjustment rate or current adjustment strategy may be set for each of the power difference intervals.

For example, after obtaining the absolute value of the power difference, the absolute value of the power difference may be compared with a plurality of the preset power difference intervals to determine an interval within which the absolute value of the power difference falls. Then, based on the interval, a corresponding current adjustment rate may be determined. Subsequently, the charging current of the energy storage device may be dynamically adjusted, including dynamically increasing or reducing the charging current. After that, based on the preset input current of the microinverter and/or the photovoltaic voltage, the input power of the microinverter may be determined again, and the power difference between the input power and the target input power may be calculated again to determine the absolute value of the power difference. Whether the charging current needs to be adjusted again may be determined based on whether the absolute value of the power difference may be greater than the preset power difference threshold. If the adjustment is needed, the absolute value of the power difference may be again compared with a plurality of the preset power difference intervals to determine an interval within which the absolute value of the power difference falls. A corresponding current adjustment rate may be determined based on the interval. The charging current of the energy storage device may be then adjusted again, until the absolute value of the power difference may be less than or equal to the preset power difference threshold.

If the adjusted charging parameter is the charging power, a corresponding power adjustment rate or power adjustment strategy may be set for each of the power difference intervals. Then, the corresponding power adjustment rate may be determined based on the absolute value of the power difference and its corresponding interval. The charging power may be then dynamically increased or reduced until the absolute value of the power difference may be less than or equal to the preset power difference threshold. The specific adjustment process may be similar to that of adjusting the charging current, and the power difference intervals and specific adjustment rates may be set to be the same or different.

The charging parameters of the energy storage device may be precisely adjusted according to the mapping relationship between the absolute value of the power difference and different power difference intervals, allowing the system to maintain an optimal operation state under different power differences and improving the stability and reliability of the system.

Figure 4:
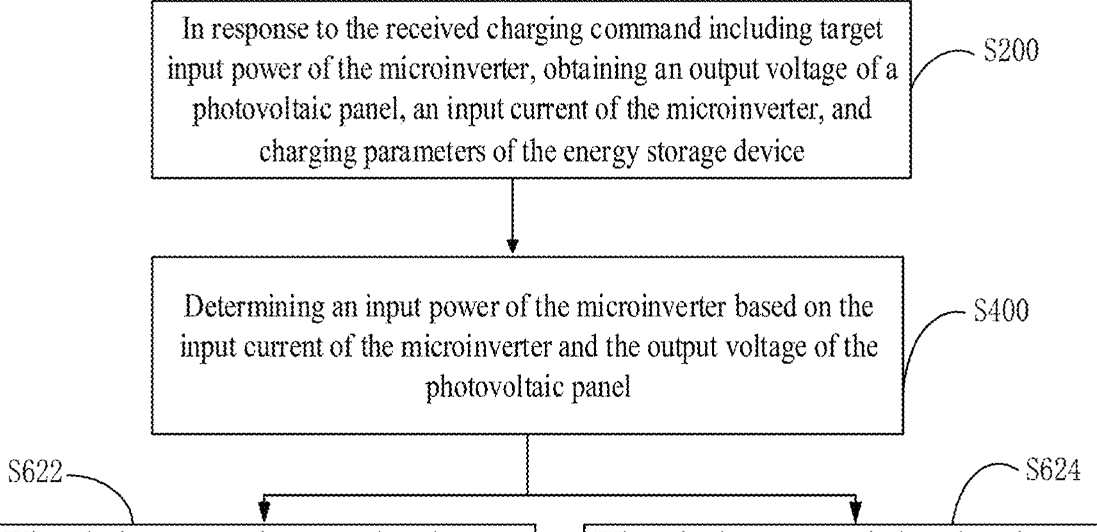
FIG. 4 depicts a detailed flowchart of a method for adjusting input power of a microinverter.

As shown in FIG. 4, S620 may comprise step S622, which may comprise, when the input power may be greater than the target input power and the absolute value of the power difference may be greater than a preset power difference threshold, increasing the charging parameters of the energy storage device based on the mapping relationship between the absolute value of the power difference and a plurality of preset power difference intervals until the absolute value of the power difference may be less than or equal to the preset power difference threshold.

After determining the input power of the microinverter, the energy storage device may compare the input power with the target input power. When the input power is greater than the target input power and the absolute value of the power difference may be greater than the preset power difference threshold, that may indicate that the charging current needs to be adjusted. For instance, the absolute value of the power difference may be compared with a plurality of the preset power difference intervals to determine an interval within which the absolute value of the power difference falls. Then, based on the determined interval, a corresponding current adjustment rate may be determined. Then, the charging current of the energy storage device may be increased based on the current adjustment rate to increase the charging power of the energy storage device, thereby reducing the input power of the microinverter and narrowing the difference between the input power and the target input power, until the power difference between the input power and the target input power may be less than or equal to the preset power difference threshold. During adjustment of the charging current, the increased charging current may be less than or equal to the maximum limit current of the microinverter. The maximum limit current of the microinverter may refer to the maximum current value that the microinverter can withstand within a short period of time, which might depend on the product design and specifications and may be usually indicated on the product nameplate.

When the input power of the microinverter may be greater than the target input power, the charging current of the energy storage device may be increased based on the mapping relationship between the power difference and the power difference intervals. Moreover, it may be ensured that the increased charging current does not exceed the maximum limit current of the microinverter, thereby achieving precise adjustment of the input power of the microinverter, optimizing a charging process of the photovoltaic energy storage system, and/or improving energy utilization and system performance.

As further shown in FIG. 4, in an example, S620 might comprise step S624, which may comprise, when the input power may be less than the target input power and the absolute value of the power difference may be greater than a preset power difference threshold, reducing the charging parameters of the energy storage device based on the mapping relationship between the absolute value of the power difference and a plurality of preset power difference intervals until the absolute value of the power difference may be less than or equal to the preset power difference threshold.

Continuing from the previous example, during the comparison between the input power and the target input power, when the input power may be less than the target input power and the absolute value of the power difference may be greater than the preset power difference threshold, it might indicate that the charging current needs to be adjusted. Specifically, the absolute value of the power difference may be compared with a plurality of the preset power difference intervals to determine an interval within which the absolute value of the power difference falls. Then, a current adjustment rate may be determined based on the interval, and the charging current of the energy storage device may be dynamically reduced based on the adjustment rate so as to reduce the charging power of the energy storage device, thereby increasing the input power of the microinverter and reducing the difference between the input power and the target input power until the power difference may be less than or equal to the preset power difference threshold. The charging current of the energy storage device may be reduced to zero, that is, the power generated by the photovoltaic panel may be entirely input to the microinverter.

When the input power of the microinverter is less than the target input power, the charging current of the energy storage device may be reduced based on the mapping relationship between the power difference and the power difference intervals, thereby increasing the input power of the microinverter. This may allow precise adjustment of the input power of the microinverter, may optimize the charging process of the photovoltaic energy storage system, and may improve energy utilization and system performance.

Increasing the charging current of the energy storage device based on the mapping relationship between the absolute value of the power difference and a plurality of the preset power difference intervals may comprise increasing the charging current of the energy storage device based on a first current adjustment rate if the absolute value of the power difference may be mapped in a first power difference interval; increasing the charging current of the energy storage device based on a second current adjustment rate if the absolute value of the power difference may be mapped in a second power difference interval; and/or increasing the charging current of the energy storage device based on a third current adjustment rate if the absolute value of the power difference may be mapped in a third power difference interval.

The numerical range of the first power difference interval may be smaller than that of the second power difference interval, and the numerical range of the second power difference interval may be smaller than that of the third power difference interval. The first current adjustment rate may be less than the second current adjustment rate, and the second current adjustment rate may be less than the third current adjustment rate.

For example, three power difference intervals may be set based on a large amount of experimental data. For example, the first power difference interval may be [0, 100], the second power difference interval may be [100, 200], and the third power difference interval may be [200, +∞]. Correspondingly, the current adjustment rate for the first power difference interval may be set as the first current adjustment rate, the current adjustment rate for the second power difference interval may be set as the second current adjustment rate, and/or the current adjustment rate for the third power difference interval may be set as the third current adjustment rate, in which the first current adjustment rate may be less than the second current adjustment rate, and the second current adjustment rate may be less than the third current adjustment rate.

For example, if the input power of the microinverter is less than the target input power, and the absolute value of the power difference may be mapped in the first power difference interval [0,100], it indicates that the power difference may be small and the required current adjustment amplitude may be also small. In this case, the first current adjustment rate, e.g., 0.05 A/s, may be applied to increase the charging current, until the absolute value of the power difference may be less than or equal to the preset power difference threshold.

If the absolute value of the power difference is mapped in the second power difference interval [100,200], it may indicate that the power difference may be relatively large and the required current adjustment amplitude may be also relatively large. In this case, the second current adjustment rate, e.g., 0.125 A/s, may be applied to increase the charging current, until the absolute value of the power difference may be less than or equal to the preset power difference threshold.

If the absolute value of the power difference is mapped in the third power difference interval [200, +∞], it may indicate the power difference may be large, and the required current adjustment amplitude may be also large. In this case, the third current adjustment rate, e.g., 1 A/s, may be applied to increase the charging current, until the absolute value of the power difference may be less than or equal to the preset power difference threshold.

During each process of increasing or reducing the charging current at the corresponding adjustment rate, the adjustment strategy may be further finely adjusted. For example, the charging power may be adjusted using a fixed adjustment value or a floating adjustment value that changes gradually. For instance, a larger floating adjustment value may be used to adjust the charging current when the power difference may be large, e.g., in the range of 50 W to 100 W, while a smaller floating adjustment value may be used to adjust the charging current when the absolute value of the power difference may be small.

If the adjusted charging parameter may be the charging power, different power adjustment rates can be set for different power difference intervals. For example, a first power adjustment rate corresponding to the first power difference interval may be set to 2 W/s, a second power adjustment rate corresponding to the second power difference interval may be set to 5 W/s, and a third power adjustment rate corresponding to the third power difference interval may be set to 40 W/s. If the absolute value of the power difference is mapped in the first power difference interval [0,100], it indicates that the power difference may be small. In this case, the first power adjustment rate of 2 W/s may be applied, that is, the magnitude of increase or reduction in the charging power per second may be determined to be 2 W. Since the voltage may be generally constant, if the charging power needs to be adjusted, the adjustment of charging power may be achieved by adjusting the charging current. Accordingly, the current adjustment rate may be determined based on the magnitude of the charging power adjustment, and the charging power may be still adjusted by adjusting the charging current. If the photovoltaic voltage at this time is 40 V, then the current adjustment magnitude per second may be determined to be 2/40=0.05 A based on the first power adjustment rate and the current photovoltaic voltage of 40 V. The charging current may be increased at a rate of 0.05 A/s until the absolute value of the power difference may be less than or equal to the preset power difference threshold. If the charging power is adjusted by adjusting the charging voltage, the change in charging voltage might cause a change in charging current. To adjust the charging power under such circumstances, it may be still possible to first determine the adjustment rate of the charging current in the case where the charging voltage changes, and then adjust the charging power by adjusting the charging current, until the absolute value of the power difference may be less than or equal to the preset power difference threshold.

If the absolute value of the power difference is mapped in the second power difference interval [100,200], it may indicate that the power difference is still relatively large. In this case, the second power adjustment rate of 5 W/s may be applied. If the photovoltaic voltage at this time is 40 V, then based on the second power adjustment rate and the current photovoltaic voltage of 40 V, the current adjustment magnitude per second may be determined to be 5/40=0.125 A. The charging current may be increased at a rate of 0.125 A/s, until the absolute value of the power difference may be less than or equal to the preset power difference threshold.

If the absolute value of the power difference is mapped in the third power difference interval [200, +], it may indicate that the power difference is large. In this case, the third power adjustment rate of 40 W/s may be applied. If the photovoltaic voltage at this time is 40 V, then based on the third power adjustment rate and the current photovoltaic voltage of 40 V, the current adjustment magnitude per second may be determined to be 40/40=1 A. The charging current may be increased at a rate of 1 A/s, until the absolute value of the power difference may be less than or equal to the preset power difference threshold.

During each process of increasing or reducing the charging power using the corresponding adjustment rate, the adjustment strategy may be further refined. For example, the charging power may be adjusted using a fixed adjustment value or a floating adjustment value that changes gradually. For instance, a larger floating adjustment value may be used to adjust the charging power when the power difference is large, e.g., in the range of 50 W to 100 W, while a small floating adjustment value may be used to adjust the charging power when the absolute value of the power difference is small.

Different current adjustment rates or power adjustment rates may be set for different power difference intervals to adjust the charging power of the energy storage device. This might enable precise power adjustment, improves stability and response speed, reduces voltage drop and power consumption, and improves the flexibility and adaptability of the system.

Reducing the charging current of the energy storage device based on the mapping relationship between the absolute value of the power difference and a plurality of the preset power difference intervals may comprise reducing the charging parameter of the energy storage device based on a preset fourth parameter adjustment rate if the absolute value of the power difference may be mapped in the first power difference interval among a plurality of the preset power difference intervals; reducing the charging parameter of the energy storage device based on a preset fifth parameter adjustment rate if the absolute value of the power difference may be mapped in the second power difference interval among a plurality of the preset power difference intervals; and/or reducing the charging parameter of the energy storage device based on a preset sixth parameter adjustment rate if the absolute value of the power difference may be mapped in the third power difference interval among a plurality of the preset power difference intervals.

Three power difference intervals as described above may be used: for example, the first power difference interval of [0, 100], the second power difference interval of [100, 200], and/or the third power difference interval of [200, too]. Additionally, the adjustment rate corresponding to the first power difference interval may be set as a fourth parameter adjustment rate. The adjustment rate corresponding to the second power difference interval may be set as a fifth parameter adjustment rate. The adjustment rate corresponding to the third power difference interval may be set as a sixth parameter adjustment rate. The fourth parameter adjustment rate may be less than the fifth parameter adjustment rate, and the fifth parameter adjustment rate may be less than the sixth parameter adjustment rate. The fourth parameter adjustment rate may be equal to or different from the first parameter adjustment rate; the fifth parameter adjustment rate may be equal to or different from the second parameter adjustment rate; and/or the sixth parameter adjustment rate may be equal to or different from the third parameter adjustment rate.

For instance, taking the charging current as an example of the adjusted charging parameter, when the input power may be less than the target input power and the absolute value of the power difference may be mapped in the first interval [0,100], it might indicate that the power difference may be small and the required current adjustment magnitude may be also small. In this case, a fourth current adjustment rate may be applied, e.g., 0.04 A/s, to reduce the charging current until the absolute value of the power difference may be less than or equal to the preset power difference threshold.

If the absolute value of the power difference is mapped in the second power difference interval [100, 200], it may indicate that the power difference may be still relatively large and the required current adjustment magnitude may be relatively large. In this case, the second current adjustment rate may be applied, e.g., 0.1 A/s, to reduce the charging current until the absolute value of the power difference may be less than or equal to the preset power difference threshold.

If the absolute value of the power difference may be mapped in the third power difference interval [200, too], it might indicate that the power difference may be large and the required current adjustment magnitude may be large. In this case, the third current adjustment rate may be applied, e.g., 0.75 A/s, to reduce the charging current until the absolute value of the power difference may be less than or equal to the preset power difference threshold.

Different power adjustment rates may be set for different power difference intervals. For example, the first power adjustment rate corresponding to the first power difference interval may be set to 2 W/s, the second power adjustment rate corresponding to the second power difference interval may be set to 5 W/s, and/or the third power adjustment rate corresponding to the third power difference interval may be set to 40 W/s.

When the input power may be less than the target input power, and the absolute value of the power difference may be mapped in the first power difference interval [0, 100] it might indicate that the power difference may be relatively small. In this case, the fourth power adjustment rate of 1 W/s may be applied. If the photovoltaic voltage at this time may be 40 V, then based on the fourth power adjustment rate and the current photovoltaic voltage of 40 V, the current adjustment magnitude per second may be determined to be 1/40=0.025 A. The charging current may be reduced at a rate of 0.025 A/s until the absolute value of the power difference may be less than or equal to the preset power difference threshold.

If the absolute value of the power difference may be mapped in the second power difference interval [100, 200], it might indicate that the power difference may be still relatively large. In this case, the fifth power adjustment rate of 4 W/s may be applied. If the photovoltaic voltage at this time is 40 V, then based on the fifth power adjustment rate and the current photovoltaic voltage of 40 V, the current adjustment magnitude per second may be determined to be 4/40=0.1 A. The charging current may be reduced at a rate of 0.1 A/s until the absolute value of the power difference may be less than or equal to the preset power difference threshold.

If the absolute value of the power difference may be mapped in the third power difference interval [200, +∞], it may indicate that the power difference may be relatively large. In this case, the sixth power adjustment rate of 30 W/s may be applied. If the photovoltaic voltage at this time is 40 V, then based on the sixth power adjustment rate and the current photovoltaic voltage of 40 V, the current adjustment magnitude per second may be determined to be 30/40=0.75 A. The charging current may be reduced at a rate of 0.75 A/s until the absolute value of the power difference may be less than or equal to the preset power difference threshold.

In Different current adjustment rates and/or power adjustment rates may be set for different power difference intervals to reduce the charging power of the energy storage device. This might enable precise power adjustment, improves stability and response speed, reduces voltage drop and power consumption, and improves the flexibility and adaptability of the system.

Figure 5:
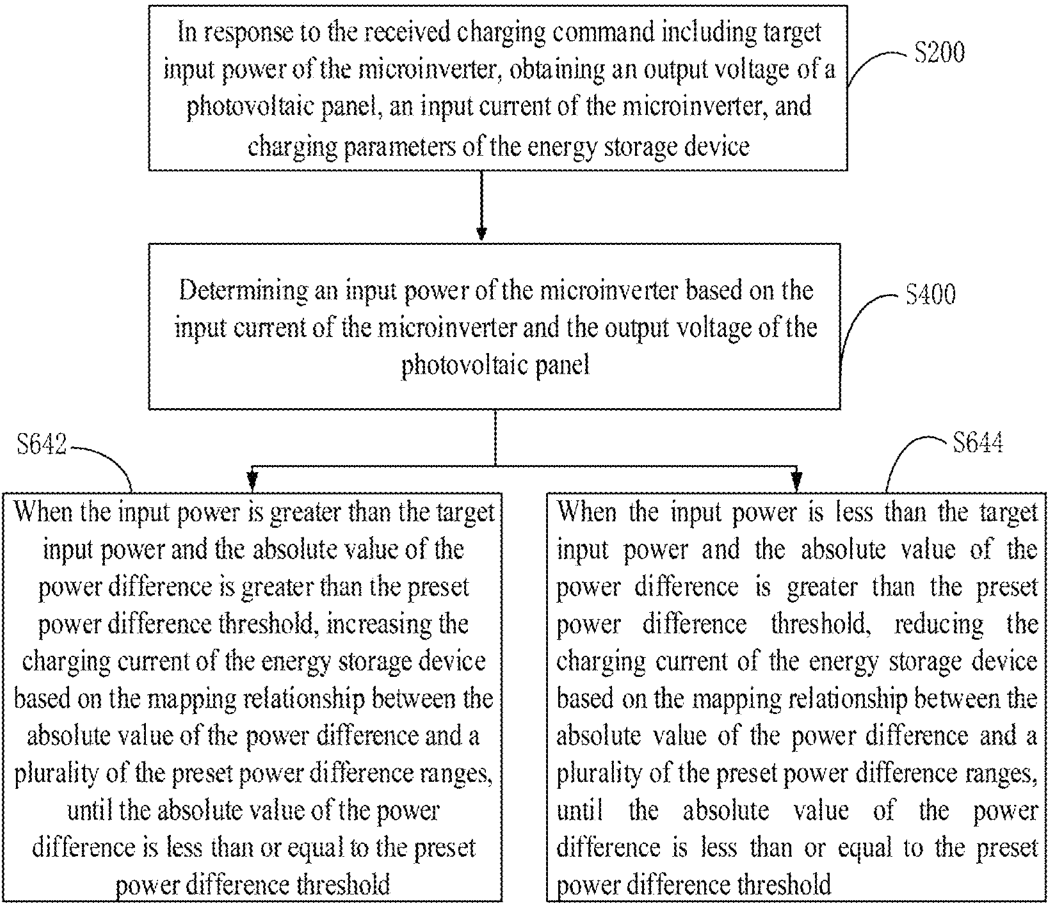
FIG. 5 depicts a detailed flowchart of a method for adjusting input power of a microinverter.

To further clarify the method for adjusting input power of a microinverter provided in the present disclosure, description may be made below with reference to a specific example and FIG. 5. The specific example includes the following steps S200 to S644.

Step S200 may comprise obtaining, in response to the received charging command including target input power of the microinverter, an output voltage of a photovoltaic panel, an input current of the microinverter, and/or charging parameters of the energy storage device.

Step S400 may comprise determining input power of the microinverter based on the input current of the microinverter and the output voltage of the photovoltaic panel.

Step S642 may comprise increasing, when the input power may be greater than the target input power and the absolute value of the power difference may be greater than the preset power difference threshold, the charging current of the energy storage device based on the mapping relationship between the absolute value of the power difference and a plurality of the preset power difference intervals until the absolute value of the power difference may be less than or equal to the preset power difference threshold.

When the input power of the microinverter is less than the target input power and the absolute value of the power difference may be mapped in the first power difference interval [0, 100], a first current adjustment rate, e.g., 0.05 A/s, may be applied to increase the charging current until the absolute value of the power difference is less than or equal to the preset power difference threshold.

If the absolute value of the power difference is mapped in the second power difference interval [100, 200], a second current adjustment rate, e.g., 0.125 A/s, may be applied to increase the charging current, until the absolute value of the power difference is less than or equal to the preset power difference threshold.

If the absolute value of the power difference is mapped in the third power difference interval (200, +∞], the third current adjustment rate, e.g., 1 A/s, may be applied to increase the charging current until the absolute value of the power difference is less than or equal to the preset power difference threshold.

Step S644 may comprise reducing, when the input power is less than the target input power and the absolute value of the power difference is greater than the preset power difference threshold, the charging current of the energy storage device based on the mapping relationship between the absolute value of the power difference and a plurality of the preset power difference intervals until the absolute value of the power difference is less than or equal to the preset power difference threshold.

Specifically, when the input power is less than the target input power and the absolute value of the power difference is mapped in the first power difference interval [0, 100], the fourth current adjustment rate, e.g., 0.04 A/s, may be applied to reduce the charging current until the absolute value of the power difference is less than or equal to the preset power difference threshold. If the absolute value of the power difference is mapped in the second power difference interval [100, 200], the second current adjustment rate, e.g., 0.1 A/s, may be applied to reduce the charging current until the absolute value of the power difference is less than or equal to the preset power difference threshold. If the absolute value of the power difference is mapped in the third power difference interval (200, +∞], the third current adjustment rate, e.g., 0.75 A/s, may be applied to reduce the charging current until the absolute value of the power difference is less than or equal to the preset power difference threshold.

Although the various steps in the flowcharts involved in the examples described above are displayed in the order indicated by the arrows, these steps are not necessarily performed in the order indicated by the arrows. there is no strict sequential restriction on the execution of these steps, and they may be performed in other orders. Furthermore, at least some of the steps in the flowcharts involved in the examples described above may include multiple steps or multiple stages, and these steps or stages need not be completed at the same time but may be executed at different times. The execution order of these steps or stages may be also not necessarily sequential but may alternate or interleave with at least part of other steps, and/or at least part of steps or stages in the other steps.

Figure 6:
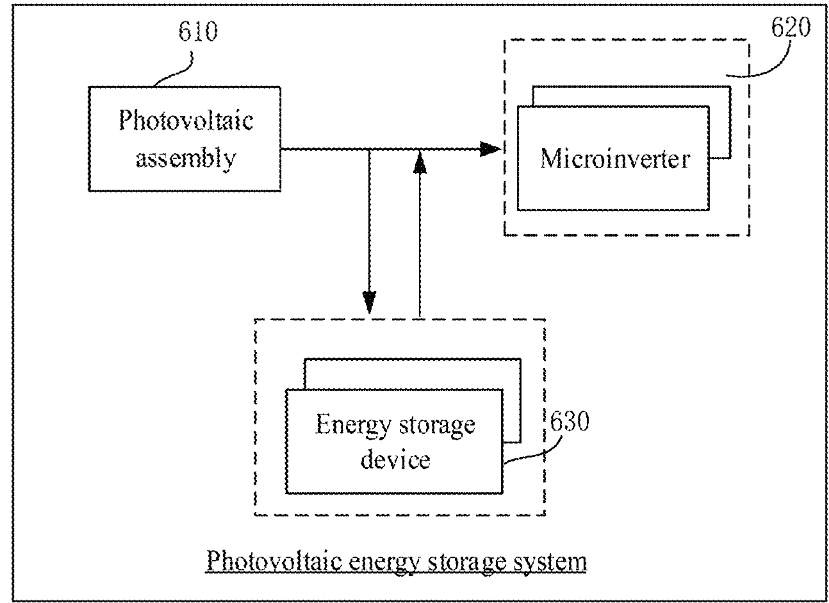
FIG. 6 depicts a block diagram of a photovoltaic energy storage system.

As shown in FIG. 6, aspects described herein further relate to a photovoltaic energy storage system 600. The system may comprise a photovoltaic assembly 610, a microinverter 620, and/or an energy storage device 630. The photovoltaic assembly 610 may be separately connected to the microinverter 620 and the energy storage device 630.

The photovoltaic assembly 610 may be configured to convert received solar energy into electrical energy and supply power to the energy storage device and the microinverter (e.g., in parallel).

The microinverter 620 may be configured to convert the received electrical energy into electrical energy to supply power to a load end, and may be configured to feed back an input current to the energy storage device upon receiving a data sampling message sent by the energy storage device.

The energy storage device 630 may be configured to adjust charging parameters of the energy storage device according to the steps in any of the above examples of the method for adjusting input power of a microinverter upon receiving a charging command including target input power of the microinverter, until the absolute value of the power difference between the input power and the target input power of the microinverter may be less than or equal to a preset power difference threshold.

The photovoltaic assembly 610 may be a component that converts solar energy into electrical energy, which may specifically include, but may be not limited to, one or more photovoltaic arrays and photovoltaic cell panels. Taking the photovoltaic panel as an example of the photovoltaic assembly, each photovoltaic panel may be connected to at least one energy storage device 630 and at least one microinverter 620 to supply power to the energy storage device 630 and the microinverter 620 in parallel. After converting solar energy into electrical energy, the photovoltaic assembly 610 may output part of the electrical energy to the energy storage device 630 for storage, and may output part of the electrical energy to the microinverter 620 which converts the electrical energy from the photovoltaic assembly 610 into electrical energy for power supply. For example, the microinverter 620 may convert the direct current (DC) generated by the photovoltaic assembly 610 into alternating current (AC) to supply power to a load end (e.g., a household). In addition, when the electrical energy generated by the photovoltaic assembly 610 exceeds the current load demand, the microinverter may direct the excess energy to the energy storage device 630 for charging. Conversely, when the photovoltaic assembly 610 supplies insufficient power, the microinverter 620 may control discharging from the energy storage device 630 to supplement the electrical energy required by the load, ensuring continuity and stability of power supply.

When a user sends a charging command including the target input power of the microinverter to the MCU of the energy storage device 630 through a user terminal, the MCU may send a data sampling message to the microinverter 620 in response to the charging command. The microinverter 620 may feed back its input current to the MCU, and the MCU may obtain the output voltage of the photovoltaic assembly 610, the input current of the microinverter 620, and/or the charging parameters of the energy storage device 630 (including the charging current or charging power). The charging parameters of the energy storage device may be adjusted according to the steps in any of the above examples of the method for adjusting input power of a microinverter until the absolute value of the power difference between the input power and the target input power of the microinverter may be less than or equal to the preset power difference threshold.

In the above example photovoltaic energy storage system, the photovoltaic panel may supply power to the energy storage device and the microinverter (e.g., in parallel), which can reasonably allocate the output power of the photovoltaic panel to the energy storage device and the microinverter and which may fully utilize the power of the photovoltaic panel and improving the overall efficiency of the system. Furthermore, the parallel power supply mode may provide flexibly increasing or reducing the number of energy storage devices and/or microinverters in the photovoltaic energy storage system according to actual needs to adapt to system changes. When one of the devices fails or encounters a problem, the system can continue supplying power through another device, thereby reducing impact of the failure on system operation and improving the reliability and stability of the system.

Moreover, the MCU of the energy storage device may be able to obtain accurate electrical energy information through real-time sampling of the output voltage of the photovoltaic panel, the input current of the microinverter, and/or the charging current of the energy storage device and may be able to determine the actual input power of the microinverter based on the input current of the microinverter and the output voltage of the photovoltaic panel and compare the actual input power with the target input power of the microinverter to obtain the absolute value of the power difference. When the absolute value of the power difference is greater than the preset power difference threshold, the input power of the energy storage device may be changed by adjusting the charging parameters of the energy storage device, thereby limiting the input power of the microinverter and gradually reducing the power difference, until the absolute value of the power difference may be less than or equal to the preset power difference threshold. This may achieve precise adjustment of the input power of the microinverter and further can improve energy conversion efficiency between photovoltaic power generation and the energy storage device.

Aspects described herein further detail a microinverter input power adjustment device for implementing the above microinverter input power adjustment method. This device may perform all or some of the processes described above. Therefore, the specific limitations of one or more examples of the microinverter input power adjustment device provided below may refer to the above descriptions of the microinverter input power adjustment method.

Figure 7:
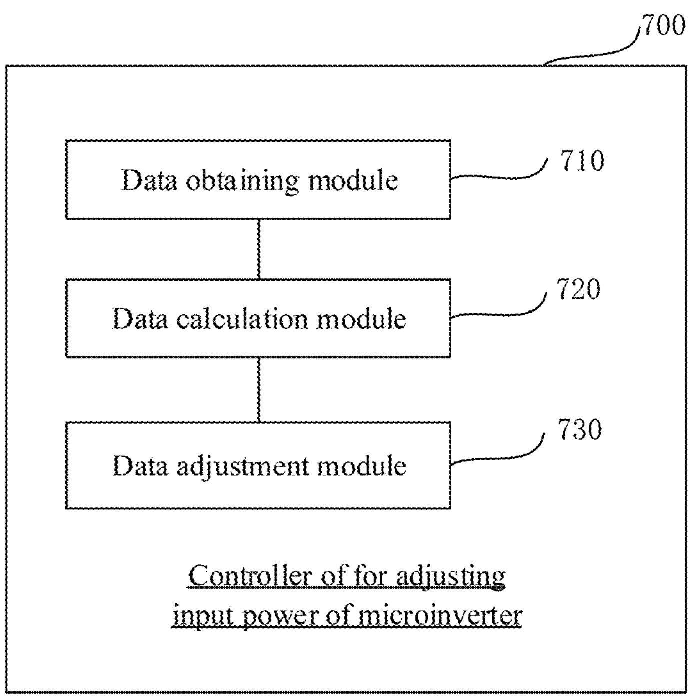
FIG. 7 depicts a block diagram of a controller for input power of a microinverter.

As shown in FIG. 7, a controller 700 for adjusting input power of a microinverter may be provided. The controller may be applicable to a photovoltaic energy storage system including a photovoltaic assembly, an energy storage device, and/or a microinverter, in which the photovoltaic assembly may be separately connected to the energy storage device and the microinverter, and the energy storage device includes the controller. Specifically, the controller may comprise a data obtaining module 710, a data calculation module 720, and/or a data adjustment module 730.

The data obtaining module 710 may be configured to, in response to the received charging command including target input power of the microinverter, obtain an output voltage of a photovoltaic panel, an input current of the microinverter, and/or charging parameters of the energy storage device.

The data calculation module 720 may be configured to determine input power of the microinverter based on the input current of the microinverter and/or the output voltage of the photovoltaic panel.

The data adjustment module 730 may be configured to adjust charging parameters of the energy storage device based on the input power of the microinverter, the target input power, and/or a preset power difference threshold, until an absolute value of power difference between the input power and the target input power of the microinverter may be less than or equal to the power difference threshold.

The data adjustment module 730 may be configured to obtain an absolute value of difference between the input power and/or the target input power of the microinverter as the absolute value of the power difference; and/or adjust charging parameters of the energy storage device based on a mapping relationship between the absolute value of the power difference and a plurality of preset power difference intervals, the different power difference intervals corresponding to different parameter adjustment rates.

The data adjustment module 730 may be configured to, when the input power of the microinverter is greater than the target input power and/or when the absolute value of the power difference is greater than the power difference threshold, increase charging parameters of the energy storage device based on the mapping relationship between the absolute value of the power difference and a plurality of preset power difference intervals until the absolute value of the power difference is less than or equal to the power difference threshold.

The data adjustment module 730 may be further configured to, when the input power of the microinverter is less than the target input power and/or when the absolute value of the power difference is greater than the preset power difference threshold, reduce charging parameters of the energy storage device based on the mapping relationship between the absolute value of the power difference and a plurality of preset power difference intervals until the absolute value of the power difference is less than or equal to the power difference threshold.

The data adjustment module 730 may be configured to increase charging parameters of the energy storage device based on a preset first parameter adjustment rate when the absolute value of the power difference may be mapped in a first power difference interval among a plurality of preset power difference intervals; increase charging parameters of the energy storage device based on a preset second parameter adjustment rate when the absolute value of the power difference may be mapped in a second power difference interval among a plurality of preset power difference intervals; and/or increase charging parameters of the energy storage device based on a preset third parameter adjustment rate when the absolute value of the power difference may be mapped in a third power difference interval among a plurality of preset power difference intervals, in which a numerical range of the first power difference interval may be smaller than a numerical range of the second power difference interval, and/or the numerical range of the second power difference interval may be smaller than a numerical range of the third power difference interval; the first parameter adjustment rate may be less than the second parameter adjustment rate, and/or the second parameter adjustment rate may be less than the third parameter adjustment rate.

The data adjustment module 730 may be configured to reduce the charging parameter of the energy storage device based on a preset fourth parameter adjustment rate when the absolute value of the power difference may be mapped in the first power difference interval among a plurality of the preset power difference intervals; reduce the charging parameter of the energy storage device based on a preset fifth parameter adjustment rate when the absolute value of the power difference may be mapped in the second power difference interval among a plurality of the preset power difference intervals; and reduce the charging parameter of the energy storage device based on a preset sixth parameter adjustment rate when the absolute value of the power difference may be mapped in the third power difference interval among a plurality of the preset power difference intervals, in which a numerical range of the first power difference interval may be smaller than a numerical range of the second power difference interval, and/or the numerical range of the second power difference interval may be smaller than a numerical range of the third power difference interval; the fourth parameter adjustment rate may be less than the fifth parameter adjustment rate, and/or the fifth parameter adjustment rate may be less than the sixth parameter adjustment rate.

The data adjustment module 730 may be further configured to adjust a charging current or charging power of the energy storage device, in which an increased charging current of the energy storage device may be less than or equal to a maximum limit current of the microinverter.

Each of the modules in the controller for adjusting input power of a microinverter may be implemented in software, hardware, or a combination of both. Each of the above modules may be embedded in or independent of the processor of the computer device in hardware form, and/or may be stored in the memory of the computer device in software form, so that the processor can invoke and execute one or more operations (e.g., any of the steps described above).

Figure 8:
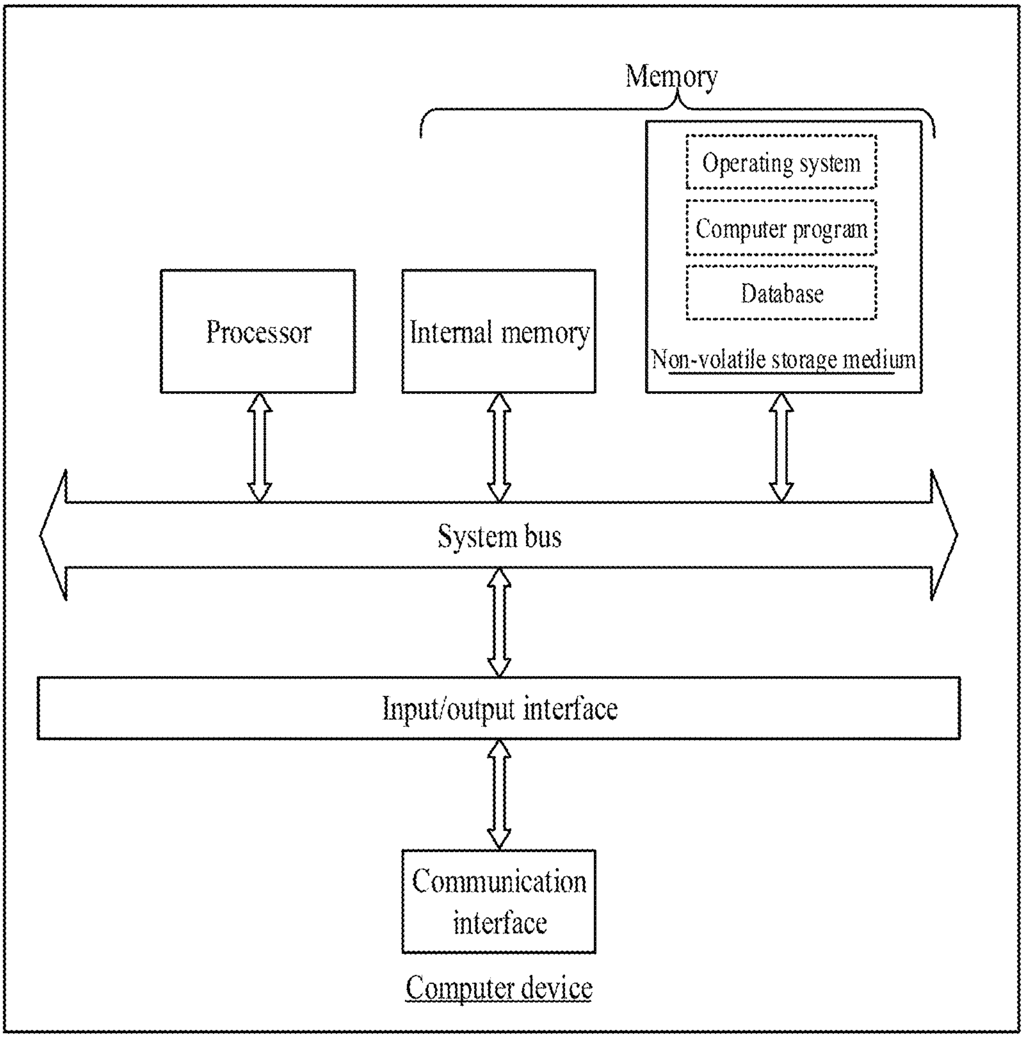
FIG. 8 depicts an internal structure diagram of a computer device.

A computer device, such as a server, may have an internal structure such as that shown in FIG. 8. The computer device may include a processor, a memory, an input/output (I/O) interface, and/or a communication interface. The processor, memory, and/or I/O interface may be connected via a system bus, and/or the communication interface may be connected to the system bus through the I/O interface. The processor of the computer device may be used for providing computing and control capabilities. The memory of the computer device may include a non-volatile storage medium and/or an internal memory. The non-volatile storage medium may store an operating system, a computer program, and/or a database. The internal memory may provide an environment for the operation of the operating system and/or computer programs stored in the non-volatile storage medium. The database of the computer device may be used to store data such as multiple power difference intervals, current adjustment rates, and/or electrical energy data. The I/O interface of the computer device may be used for information exchange between the processor and external devices. The communication interface of the computer device may be used for network communication with external terminals. When executed by the processor, the computer program may implement the method for adjusting the input power of the microinverter.

The structure shown in FIG. 8 is merely a block diagram illustrating part of the structure related to the solution of the present disclosure, and does not limit the computer device to which the present solution may be applied. The specific computer device may include more or less components than those shown in the figure, may combine certain components, and/or may have a different component arrangement.

In an example, a computer device may be provided, which may include a memory in which a computer program may be stored and/or a processor that performs one or more of the steps of any of the examples of the method for adjusting input power of a microinverter.

In an example, a computer-readable storage medium may be provided, on which a computer program may be stored. When the computer program is executed by a processor, one or more of the steps of any of the examples of the method for adjusting input power of a microinverter described above may be performed.

In an example, a computer program product may be provided, which may include a computer program. When executed by a processor, the computer program may cause performance of one or more of the steps of any of the examples of the method for adjusting input power of a microinverter.

The photovoltaic energy storage system may include two or more energy storage devices and/or two or more microinverters. The photovoltaic assembly may be connected to these energy storage devices and microinverters separately. The photovoltaic energy storage system may additionally and/or alternatively perform one or more of the steps as described above with respect to the energy storage device, and these microinverters may perform one or more of the steps described above with respect to the microinverter.

Data involved in the present disclosure (including but not limited to data used for analysis, such as the output voltage of the photovoltaic panel, the input current of the microinverter, the charging parameters of the energy storage device, stored data, displayed data, etc.) may be obtained with user authorization or with full authorization from relevant parties. The collection, use, and processing of the relevant data shall comply with applicable laws, regulations, and standards of the relevant countries and regions.

All or part of the processes in the above examples may be accomplished by instructing relevant hardware through a computer program. The computer program may be stored in a non-volatile computer-readable storage medium, and may be capable of, when executed, causing performance of one or more of the steps described herein. Any reference to memory, database, or other media used herein may include at least one of non-volatile and volatile memories. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a random-access memory (RAM) or an external cache memory, and the like. As an illustration and not a limitation, the RAM may take various forms, such as a static random-access memory (SRAM) or a dynamic random-access memory (DRAM), and the like. The databases involved in the examples provided in the present disclosure may include at least one of relational databases and non-relational databases. Non-relational databases may include distributed databases based on blockchain, but are not limited to these. The processors involved in the examples provided in the present disclosure may be general-purpose processors, central processing units, graphics processors, digital signal processors, programmable logic units, quantum computing based data processing logic units, and the like, but are not limited to these.

The technical features of the examples can be combined in any way. For conciseness of description, not all possible combinations of the technical features in the examples described above are described. However, these combinations should be within the scope of the description.

The examples described above represent only several examples of the present disclosure, which are described specifically in detail, but should not be construed as limitations on the scope of the present disclosure. Several variations and improvements can be made without departing from the spirit of the disclosure, all of which fall within the scope of the present disclosure.

What is claimed is:

1. A method comprising:

in response receiving a charging command comprising a target input power of a microinverter of a photovoltaic energy storage system, obtaining:

an output voltage of a photovoltaic panel, an input current of the microinverter, and charging parameters of an energy storage device of the photovoltaic energy storage system;

determining, based on the input current of the microinverter and the output voltage of the photovoltaic panel, input power of the microinverter; and adjusting, based on the input power of the microinverter, the target input power, and a preset power difference threshold, charging parameters of the energy storage device until an absolute value of power difference between the input power and the target input power of the microinverter is less than or equal to the power difference threshold.

2. The method of claim 1, wherein the adjusting the charging parameters of the energy storage device comprises:

determining a difference between the input power and the target input power of the microinverter; and adjusting, based on a mapping relationship between the difference and a plurality of preset power difference intervals, charging parameters of the energy storage device, wherein each of the plurality of preset power difference intervals correspond to different parameter adjustment rates.

3. The method of claim 1, wherein the adjusting the charging parameters of the energy storage device comprises:

based on determining that the input power of the microinverter is greater than the target input power, and based on determining that a difference between the input power and the target input power of the microinverter is greater than a preset power difference threshold, increasing, based on a mapping relationship between the difference and a plurality of preset power difference intervals, charging parameters of the energy storage device.

4. The method of claim 1, wherein the adjusting the charging parameters of the energy storage device comprises:

based on determining that the input power of the microinverter is less than the target input power, and based on determining that a difference between the input power and the target input power of the microinverter is greater than a preset power difference threshold, reducing, based on a mapping relationship between the difference and a plurality of preset power difference intervals, charging parameters of the energy storage device.

5. The method of claim 1, wherein the adjusting the charging parameters of the energy storage device comprises one or more of:

based on determining that a difference between the input power and the target input power of the microinverter is within a first power difference interval of a plurality of present power difference intervals, increasing charging parameters of the energy storage device based on a first preset parameter adjustment rate;

based on determining that the difference between the input power and the target input power of the microinverter is within a second power difference interval of the plurality of present power difference intervals, increasing charging parameters of the energy storage device based on a second preset parameter adjustment rate; or based on determining that the difference between the input power and the target input power of the microinverter is within a third power difference interval of the plurality of present power difference intervals, increasing charging parameters of the energy storage device based on a third preset parameter adjustment rate, wherein a numerical range of the first power difference interval is smaller than a numerical range of the second power difference interval, wherein the numerical range of the second power difference interval is smaller than a numerical range of the third power difference interval, wherein the first preset parameter adjustment rate is less than the second preset parameter adjustment rate, and wherein the second preset parameter adjustment rate is less than the third preset parameter adjustment rate.

6. The method of claim 1, further comprising:

reducing, based on a difference between the input power and the target input power of the microinverter, the charging parameters of the energy storage device by one or more of:

based on determining that the difference is within a first power difference interval of a plurality of preset power difference intervals, reducing the charging parameter of the energy storage device based on a fourth parameter adjustment rate;

based on determining that the difference is within a second power difference interval of the plurality of preset power difference intervals, reducing the charging parameter of the energy storage device based on a fifth parameter adjustment rate; or based on determining that the difference is within a third power difference interval of the plurality of preset power difference intervals, reducing the charging parameter of the energy storage device based on a sixth parameter adjustment rate, wherein a numerical range of the first power difference interval is smaller than a numerical range of the second power difference interval, wherein the numerical range of the second power difference interval is smaller than a numerical range of the third power difference interval, wherein the fourth parameter adjustment rate is less than the fifth parameter adjustment rate, and wherein the fifth parameter adjustment rate is less than the sixth parameter adjustment rate.

7. The method of claim 1, wherein the adjusting the charging parameters of the energy storage device comprises:

adjusting a charging current or charging power of the energy storage device, wherein the adjusted charging current of the energy storage device is less than or equal to a maximum limit current of the microinverter.

8. A photovoltaic energy storage system comprising:

a photovoltaic assembly, a microinverter, and an energy storage device, wherein the photovoltaic assembly is separately connected to the microinverter and the energy storage device, wherein the photovoltaic assembly is configured to:

convert received solar energy into electrical energy, and supply power to the energy storage device and the microinverter;

wherein the microinverter is configured to:

supply power to a load end by converting the received power from the photovoltaic assembly; and provide, based on receiving a data sampling message from the energy storage device, an input current to the energy storage device; and wherein the energy storage device is configured to:

based on receiving charging command comprising target input power of the microinverter, obtain:

an output voltage of a photovoltaic panel, an input current of the microinverter, and charging parameters of an energy storage device of the photovoltaic energy storage system;

determine, based on the input current of the microinverter and the output voltage of the photovoltaic panel, input power of the microinverter; and adjust, based on the input power of the microinverter, the target input power, and a preset power difference threshold, charging parameters of the energy storage device until an absolute value of power difference between the input power and the target input power of the microinverter is less than or equal to the power difference threshold.

9. The photovoltaic energy storage system of claim 8, wherein the energy storage device is configured to adjust the charging parameters of the energy storage device by:

determining a difference between the input power and the target input power of the microinverter; and adjusting, based on a mapping relationship between the difference and a plurality of preset power difference intervals, charging parameters of the energy storage device, wherein each of the plurality of preset power difference intervals correspond to different parameter adjustment rates.

10. The photovoltaic energy storage system of claim 8, wherein the energy storage device is configured to adjust the charging parameters of the energy storage device by:

based on determining that the input power of the microinverter is greater than the target input power, and based on determining that a difference between the input power and the target input power of the microinverter is greater than a preset power difference threshold, increasing, based on a mapping relationship between the difference and a plurality of preset power difference intervals, charging parameters of the energy storage device.

11. The photovoltaic energy storage system of claim 8, wherein the energy storage device is configured to adjust the charging parameters of the energy storage device by:

based on determining that the input power of the microinverter is less than the target input power, and based on determining that a difference between the input power and the target input power of the microinverter is greater than a preset power difference threshold, reducing, based on a mapping relationship between the difference and a plurality of preset power difference intervals, charging parameters of the energy storage device.

12. The photovoltaic energy storage system of claim 8, wherein the energy storage device is configured to adjust the charging parameters of the energy storage device by:

based on determining that a difference between the input power and the target input power of the microinverter is within a first power difference interval of a plurality of present power difference intervals, increasing charging parameters of the energy storage device based on a first preset parameter adjustment rate;

based on determining that the difference between the input power and the target input power of the microinverter is within a second power difference interval of the plurality of present power difference intervals, increasing charging parameters of the energy storage device based on a second preset parameter adjustment rate; or based on determining that the difference between the input power and the target input power of the microinverter is within a third power difference interval of the plurality of present power difference intervals, increasing charging parameters of the energy storage device based on a third preset parameter adjustment rate, wherein a numerical range of the first power difference interval is smaller than a numerical range of the second power difference interval, wherein the numerical range of the second power difference interval is smaller than a numerical range of the third power difference interval, wherein the first preset parameter adjustment rate is less than the second preset parameter adjustment rate, and wherein the second preset parameter adjustment rate is less than the third preset parameter adjustment rate.

13. The photovoltaic energy storage system of claim 8, wherein the energy storage device is further configured to:

reduce, based on a difference between the input power and the target input power of the microinverter, the charging parameters of the energy storage device by one or more of:

based on determining that the difference is within a first power difference interval of a plurality of preset power difference intervals, reducing the charging parameter of the energy storage device based on a fourth parameter adjustment rate;

based on determining that the difference is within a second power difference interval of the plurality of preset power difference intervals, reducing the charging parameter of the energy storage device based on a fifth parameter adjustment rate; or based on determining that the difference is within a third power difference interval of the plurality of preset power difference intervals, reducing the charging parameter of the energy storage device based on a sixth parameter adjustment rate, wherein a numerical range of the first power difference interval is smaller than a numerical range of the second power difference interval, wherein the numerical range of the second power difference interval is smaller than a numerical range of the third power difference interval, wherein the fourth parameter adjustment rate is less than the fifth parameter adjustment rate, and wherein the fifth parameter adjustment rate is less than the sixth parameter adjustment rate.

14. The photovoltaic energy storage system of claim 8, wherein the energy storage device is configured to adjust the charging parameters of the energy storage device by:

adjusting a charging current or charging power of the energy storage device, wherein the adjusted charging current of the energy storage device is less than or equal to a maximum limit current of the microinverter.

15. A controller of input power of a microinverter of a photovoltaic energy storage system, wherein the photovoltaic energy storage system comprises:

a photovoltaic assembly, an energy storage device, the microinverter, wherein which the photovoltaic assembly is separately connected to the energy storage device and the microinverter, and the controller, wherein the controller comprises:

a data obtaining module configured to:

in response to receiving a charging command comprising target input power of the microinverter, obtain:

an output voltage of a photovoltaic panel, an input current of the microinverter, and charging parameters of the energy storage device;

a data calculation module configured to:

determine, based on the input current of the microinverter and the output voltage of the photovoltaic panel, input power of the microinverter; and a data adjustment module configured to:

adjust, based on the input power of the microinverter, the target input power, and a preset power difference threshold, charging parameters of the energy storage device until an absolute value of power difference between the input power and the target input power of the microinverter is less than or equal to the power difference threshold.

16. The controller of claim 15, wherein the data calculation module is configured to adjust the charging parameters of the energy storage device by:

determining a difference between the input power and the target input power of the microinverter; and adjusting, based on a mapping relationship between the difference and a plurality of preset power difference intervals, charging parameters of the energy storage device, wherein each of the plurality of preset power difference intervals correspond to different parameter adjustment rates.

17. The controller of claim 15, wherein the data calculation module is configured to adjust the charging parameters of the energy storage device by:

based on determining that the input power of the microinverter is greater than the target input power, and based on determining that a difference between the input power and the target input power of the microinverter is greater than a preset power difference threshold, increasing, based on a mapping relationship between the difference and a plurality of preset power difference intervals, charging parameters of the energy storage device.

18. The controller of claim 15, wherein the data calculation module is configured to adjust the charging parameters of the energy storage device by:

based on determining that the input power of the microinverter is less than the target input power, and based on determining that a difference between the input power and the target input power of the microinverter is greater than a preset power difference threshold, reducing, based on a mapping relationship between the difference and a plurality of preset power difference intervals, charging parameters of the energy storage device.

19. The controller of claim 15, wherein the data calculation module is configured to adjust the charging parameters of the energy storage device by:

based on determining that a difference between the input power and the target input power of the microinverter is within a first power difference interval of a plurality of present power difference intervals, increasing charging parameters of the energy storage device based on a first preset parameter adjustment rate;

based on determining that the difference between the input power and the target input power of the microinverter is within a second power difference interval of the plurality of present power difference intervals, increasing charging parameters of the energy storage device based on a second preset parameter adjustment rate; or based on determining that the difference between the input power and the target input power of the microinverter is within a third power difference interval of the plurality of present power difference intervals, increasing charging parameters of the energy storage device based on a third preset parameter adjustment rate, wherein a numerical range of the first power difference interval is smaller than a numerical range of the second power difference interval, wherein the numerical range of the second power difference interval is smaller than a numerical range of the third power difference interval, wherein the first preset parameter adjustment rate is less than the second preset parameter adjustment rate, and wherein the second preset parameter adjustment rate is less than the third preset parameter adjustment rate.

20. The controller of claim 15, wherein the data calculation module is further configured to:

reduce, based on a difference between the input power and the target input power of the microinverter, the charging parameters of the energy storage device by one or more of:

based on determining that the difference is within a first power difference interval of a plurality of preset power difference intervals, reducing the charging parameter of the energy storage device based on a preset fourth parameter adjustment rate;

based on determining that the difference is within a second power difference interval of the plurality of preset power difference intervals, reducing the charging parameter of the energy storage device based on a preset fifth parameter adjustment rate; or based on determining that the difference is within a third power difference interval of the plurality of preset power difference intervals, reducing the charging parameter of the energy storage device based on a preset sixth parameter adjustment rate, wherein a numerical range of the first power difference interval is smaller than a numerical range of the second power difference interval, wherein the numerical range of the second power difference interval is smaller than a numerical range of the third power difference interval, wherein the fourth parameter adjustment rate is less than the fifth parameter adjustment rate, and wherein the fifth parameter adjustment rate is less than the sixth parameter adjustment rate.

* * * * *